US011492925B2

(12) United States Patent
Pretty

(10) Patent No.: US 11,492,925 B2
(45) Date of Patent: Nov. 8, 2022

(54) MAGNETIC FIRE SEAL FOR AIRCRAFT NACELLE

(71) Applicant: ROHR, INC., Chula Vista, CA (US)

(72) Inventor: Michael Sean Pretty, Jamul, CA (US)

(73) Assignee: ROHR, INC., Chula Vista, CA (US)

( * ) Notice: Subject to any disclaimer, the term of this patent is extended or adjusted under 35 U.S.C. 154(b) by 995 days.

(21) Appl. No.: 16/180,297

(22) Filed: Nov. 5, 2018

(65) Prior Publication Data

US 2020/0109644 A1 Apr. 9, 2020

Related U.S. Application Data

(60) Provisional application No. 62/740,637, filed on Oct. 3, 2018.

(51) Int. Cl.

| F01D 25/14 | (2006.01) |
|---|---|
| B64D 27/26 | (2006.01) |
| B64D 29/06 | (2006.01) |
| F01D 25/24 | (2006.01) |
| F16J 15/02 | (2006.01) |

(52) U.S. Cl.
CPC ............ *F01D 25/14* (2013.01); *B64D 27/26* (2013.01); *B64D 29/06* (2013.01); *F01D 25/24* (2013.01); *F16J 15/027* (2013.01); *F05D 2220/323* (2013.01); *F05D 2240/55* (2013.01); *F05D 2240/90* (2013.01)

(58) Field of Classification Search
CPC ..... B64D 27/26; B64D 29/06; F05D 2240/90; F02K 1/805; F16J 15/027
See application file for complete search history.

(56) References Cited

U.S. PATENT DOCUMENTS

| 3,869,132 | A | 3/1975 | Taylor et al. | |
|---|---|---|---|---|
| 7,384,494 | B2 | 6/2008 | Kosty et al. | |
| 9,382,808 | B2 | 7/2016 | Hodgkinson | |
| 9,618,123 | B2* | 4/2017 | Pretty | F16J 15/061 |
| 2003/0111802 | A1* | 6/2003 | Nozaki | F16J 15/027 |
| | | | | 277/628 |
| 2014/0319269 | A1* | 10/2014 | Scarr | B64D 29/06 |
| | | | | 244/54 |
| 2015/0098810 | A1* | 4/2015 | Soria | F01D 25/28 |
| | | | | 415/200 |
| 2015/0143796 | A1* | 5/2015 | Lacko | F02K 1/64 |
| | | | | 60/226.2 |

(Continued)

FOREIGN PATENT DOCUMENTS

| EP | 2910822 | 8/2015 |
|---|---|---|
| EP | 3284914 | 2/2018 |

OTHER PUBLICATIONS

European Patent Office, European Search Report dated Feb. 20, 2020 in Application No. 19195717.4.

*Primary Examiner* — Richard R. Green
*Assistant Examiner* — Arfan Y. Sinaki
(74) *Attorney, Agent, or Firm* — Snell & Wilmer L.L.P.

(57) ABSTRACT

A magnetic fire seal for a nacelle may comprise an exterior surface configured to form a sealing interface and an interior surface opposite the exterior surface. A fire-resistant material may be disposed between the exterior surface and the interior surface. A magnet may be located at the interior surface proximate the sealing interface. A portion of the fire-resistant material may be located between the magnet and the exterior surface.

18 Claims, 5 Drawing Sheets

(56) References Cited

U.S. PATENT DOCUMENTS

| | | | |
|---|---|---|---|
| 2015/0175272 A1* | 6/2015 | Brochard | A62C 3/08 |
| | | | 244/54 |
| 2015/0233261 A1* | 8/2015 | Hodgkinson | F01D 11/005 |
| | | | 277/594 |
| 2015/0266561 A1* | 9/2015 | Hariram | B60J 10/38 |
| | | | 49/475.1 |
| 2016/0061328 A1 | 3/2016 | Ritoper et al. | |
| 2016/0161001 A1* | 6/2016 | Jobe | F16J 15/061 |
| | | | 277/629 |
| 2018/0058993 A1* | 3/2018 | Terentiev | G01R 33/00 |
| 2018/0156051 A1* | 6/2018 | Strutt | B64D 29/06 |
| 2018/0156129 A1* | 6/2018 | Takeuchi | B64D 45/00 |
| 2018/0156131 A1* | 6/2018 | Olson | B64D 29/06 |
| 2018/0163631 A1* | 6/2018 | Takeuchi | B64D 45/00 |
| 2018/0299189 A1* | 10/2018 | Johnson | F25D 23/087 |
| 2019/0300189 A1* | 10/2019 | Ratajac | B64D 27/20 |
| 2020/0262539 A1* | 8/2020 | Studer | F01D 11/005 |

\* cited by examiner

MAGNETIC FIRE SEAL FOR AIRCRAFT NACELLE

CROSS REFERENCE TO RELATED APPLICATIONS

This application claims priority to, and the benefit of, U.S. Provisional Application No. 62/740,637, filed Oct. 3, 2018, and entitled "MAGNETIC FIRE SEAL FOR AIRCRAFT NACELLE," the entirety of which is incorporated herein for all purposes by reference.

FIELD

The present disclosure relates to aircraft nacelle seals, and more particularly to aircraft nacelle seals having a magnet proximate the sealing interface.

BACKGROUND

A nacelle for a turbine engine typically includes an inlet section, a fan cowl section, a thrust reverser section, and an exhaust section. The nacelle is typically mounted to a wing or a fuselage of an aircraft via a pylon. The thrust reverser section is typically split into two halves comprising inner fixed structure (IFS) halves. An upper bifurcation fire seal may be disposed between each of the IFS halves and the pylon. In the event of a burst duct or other engine structure failure, a large pressure differential may be created between the interior and exterior of the nacelle. The increased pressure differential may force the IFS halves away from the pylon, thereby increasing the space, or "gap," the fire seal needs to fill to maintain a sealing interface with the pylon.

SUMMARY

A magnetic fire seal for a nacelle is disclosed herein. In accordance with various embodiments, the magnetic fire seal may comprise an exterior surface configured to form a sealing interface and an interior surface opposite the exterior surface. A fire-resistant material may be disposed between the exterior surface and the interior surface, and a magnet may be located at the interior surface and proximate the sealing interface. A portion of the fire-resistant material may be located between the magnet and the exterior surface.

In various embodiments, the fire-resistant material may comprise a melting temperature of greater than 600° Fahrenheit. In various embodiments, the magnetic fire seal may be configured to withstand a pressure differential of at least 6.5 pounds per square inch.

In various embodiments, the magnet may be configured to stretch the magnetic fire seal such that an angle formed by a portion of the interior surface proximate the magnet decreases. In various embodiments, the magnetic fire seal may be configured such that, in a stretched position, an interior height of the magnetic fire seal, as measured at the interior surface in a direction perpendicular to the sealing interface, is greater than an interior width of the magnetic fire seal, as measured at the interior surface in a direction parallel to the sealing interface.

In various embodiments, the magnet may span between 10% to 30% of a circumference of the interior surface. In various embodiments, the magnetic fire seal may be configured such that in the stretched position, a length of the sealing interface is at least 2% of an exterior width of the magnetic fire seal, as measured at the exterior surface in the direction parallel to the sealing interface.

In various embodiments, a thickness of the magnet, as measured in a direction extending from the interior surface to the exterior surface, may be between 5% to 50% of a thickness of the magnetic fire seal, as measured between the interior surface and the exterior surface in an equilibrium position.

Also disclosed herein is a propulsion system. In accordance with various embodiments, the propulsion system may comprise a pylon, an inner fixed structure hingeably coupled to the pylon, and a magnetic fire seal coupled to the inner fixed structure. The magnetic fire seal may comprise an exterior surface configured to form a sealing interface with the pylon, an interior surface opposite the exterior surface, a fire-resistant material surrounded by the exterior surface and the interior surface, and a magnet located between the interior surface and the exterior surface and proximate the sealing interface.

In various embodiments, an exterior height of the magnetic fire seal, as measured with the magnetic fire seal in an equilibrium position, may be less than a distance between the pylon and the inner fixed structure, as measured during a burst event.

In various embodiments, the inner fixed structure may define at least a portion of a core engine compartment. The magnetic fire seal may provide sealing between the core engine compartment and an area exterior to the core engine compartment. In various embodiments, an exterior height of the magnetic fire seal, as measured with the magnetic fire seal in an equilibrium position, may be less than a distance between the pylon and the inner fixed structure, as measured at pressure differential of 6.5 pounds per square inch between the core engine compartment and the area exterior to the core engine compartment.

In various embodiments, a portion of the fire-resistant material may be located between the magnet and the exterior surface. In various embodiments, the fire-resistant material may comprise a melting temperature of greater than 600° Fahrenheit.

In various embodiments, the magnetic fire seal may comprise an upper bifurcation seal portion coupled to an upper bifurcation wall of the inner fixed structure, and a forward edge seal portion coupled to a forward edge of the inner fixed structure.

In various embodiments, the magnetic fire seal may be configured such that in a stretched position, an interior height of the magnetic fire seal, as measured at the interior surface in a direction perpendicular to the sealing interface, is greater than an interior width of the magnetic fire seal, as measured at the interior surface in a direction parallel to the sealing interface.

In accordance with various embodiments, a propulsion system may comprise a gas turbine engine and a pylon mounted to the gas turbine engine. An inner fixed structure may be hingeably coupled to the pylon. A magnetic fire seal may be located in a sealing envelope defined, at least, partially by the inner fixed structure and at least one of the pylon or the gas turbine engine. The magnetic fire seal may comprise an exterior surface configured to form a sealing interface with the at least one of the pylon or the gas turbine engine, an interior surface opposite the exterior surface, a fire-resistant material surrounded by the exterior surface and the interior surface, and a magnet located proximate the sealing interface.

In various embodiments, a portion of the fire-resistant material may be located between the magnet and the exterior surface.

In various embodiments, the inner fixed structure may define, at least, a portion of a core engine compartment. The magnetic fire seal may provide sealing between the core engine compartment and an area exterior to the core engine compartment. In various embodiments, an exterior height of the magnetic fire seal, as measured with the magnetic fire seal in an equilibrium position, may be less than a distance between the inner fixed structure and the at least one of the pylon or the gas turbine engine, as measured at pressure differential of 6.5 pounds per square inch between the core engine compartment and the area exterior to the core engine compartment.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "proximate" refers to a direction towards, or generally closer to, a referenced component.

Magnetic fire seals, as described herein, may provide a seal capable of accommodating large deflections and pressure differentials, such as those that occur during a burst duct or other failure event. In various embodiments, the magnetic fire seal may be located in a sealing envelope defined by an IFS and a second structure (e.g., a pylon or engine case structure). The magnetic fire seal includes a fire resistant material with a magnet incorporated therein. The magnet is configured to stretch the magnetic fire seal such that a sealing interface may be maintained at greater deflection distances and/or at greater pressure differentials. Configuring the magnetic fire seal to stretch may also allow for smaller diameter seals. Maintaining the sealing interface may allow for removal of pressure relief doors, thereby decreasing nacelle cost and complexity.

Figure 1A:
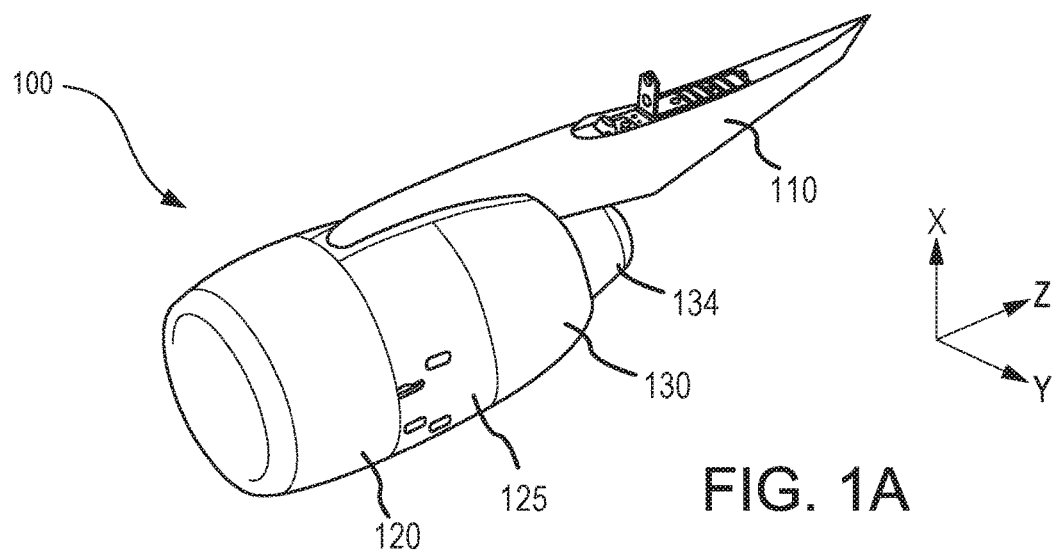
FIG. 1A illustrates a perspective view of a nacelle for a propulsion system, in accordance with various embodiments.

Referring to FIG. 1A, a nacelle 100 for a propulsion system is illustrated, in accordance with various embodiments. Nacelle 100 may comprise an inlet 120, a fan cowl 125, a thrust reverser 130, and an exhaust system 134. Nacelle 100 may be coupled to a pylon 110, which may mount nacelle 100 and an engine surrounded by nacelle 100 to an aircraft wing or aircraft body.

Figure 1B:
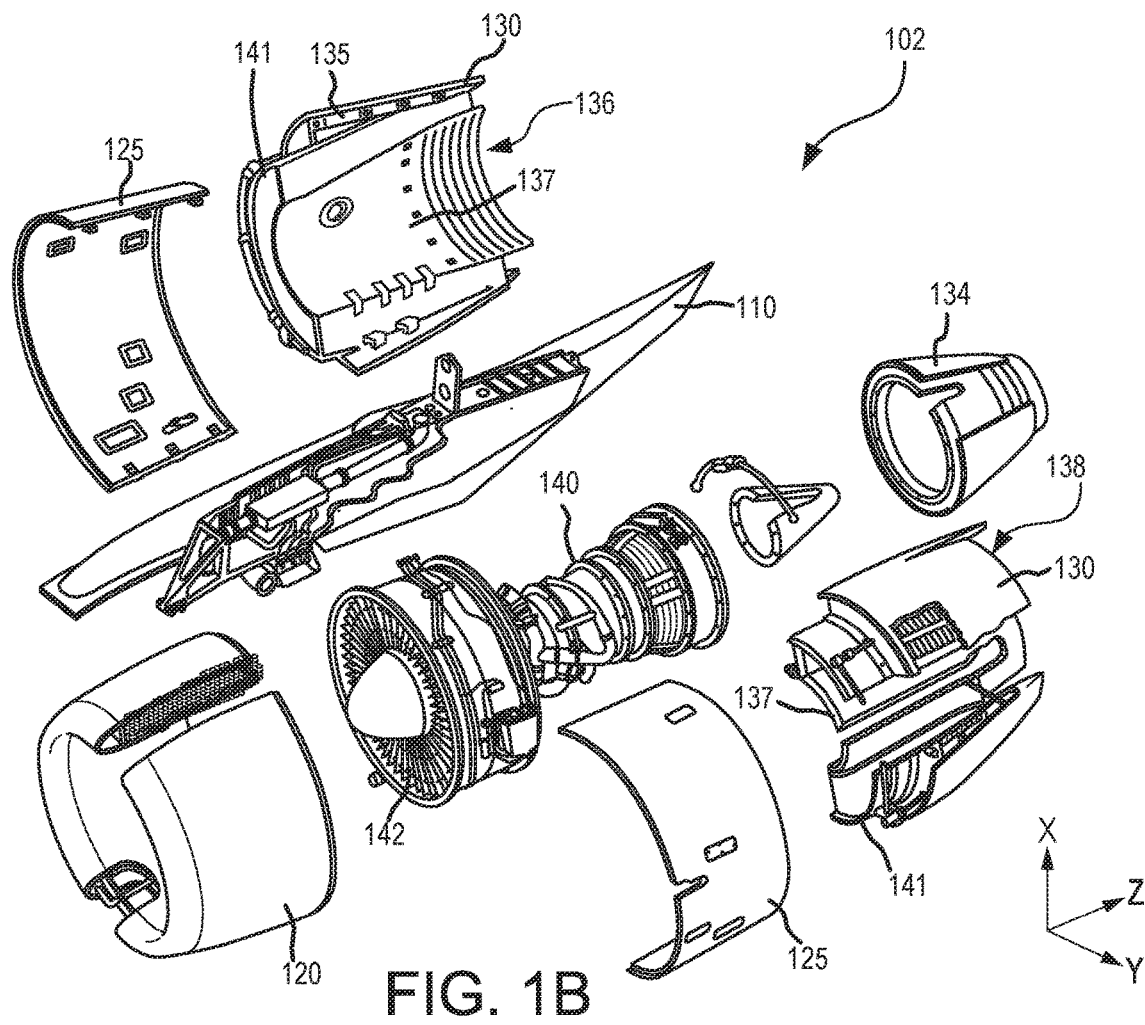
FIG. 1B illustrates an exploded view of a propulsion system, in accordance with various embodiments.

With reference to FIG. 1B, and continuing reference to FIG. 1A, an exploded view of a propulsion system 102 is illustrated, in accordance with various embodiments. In accordance with various embodiments, propulsion system 102 includes nacelle 100 and a gas turbine engine 140. Gas turbine engine 140 may be surrounded by components of nacelle 100. Nacelle 100 may provide smooth aerodynamic surfaces for airflow around and into gas turbine engine 140. Nacelle 100 may define at least a portion of one or more bypass air duct(s) through propulsion system 102.

In operation, a fan 142 of gas turbine engine 140 draws and directs a flow of air into and through propulsion system 102. The air may be divided into two principal flow paths: a core flowpath through the core of gas turbine engine 140, and a bypass flowpath through one or bypass ducts outside of the core of gas turbine engine 140. The air in the core flowpath may be directed through a compressor of gas turbine engine 140 that increases the air flow pressure, and then through a combustor of gas turbine engine 140 where the air is mixed with fuel and ignited. The combustion of the fuel and air mixture causes a series of turbine blades aft of the combustor to rotate and drive the rotors and fan of gas turbine engine 140. The exhaust gases are then directed through exhaust system 134.

The air in the bypass flowpath may be directed around the engine core through one or more duct(s) defined by nacelle 100. In various embodiments, at least a portion of the bypass flowpath is defined by thrust reverser 130. For example, thrust reverser 130 may comprise an inner fixed structure (IFS) 137 and an outer sleeve 141. Bypass air from output from fan 142 may flow between an exterior (or radially outward) surface of IFS 137 and an interior (or radially inward) surface of outer sleeve 141.

Thrust reverser 130 may be split into a left (or first) half 136 and a right (or second) half 138. Left and right thrust reverser halves 136, 138 are generally configured to surround the core (e.g., compressor, combustor, and turbine sections) of gas turbine engine 140. Left thrust reverser half 136 and right thrust reverser half 138 may be hinged to pylon 110. Left thrust reverser half 136 and right thrust reverser half 138 may pivot relative to pylon 110 in order to provide access to gas turbine engine 140.

Figure 2:
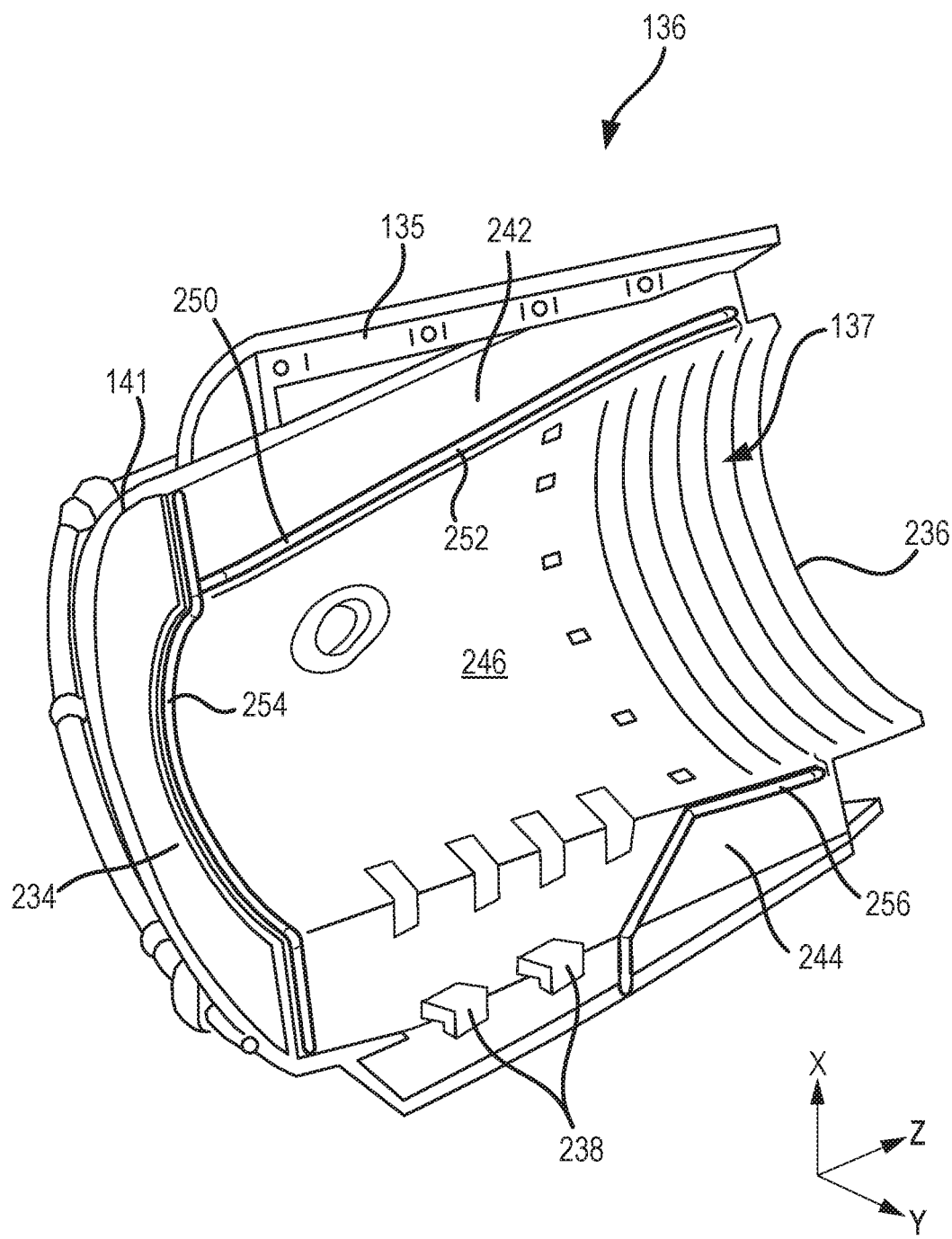
FIG. 2 illustrates a perspective inside view of a left thrust reverser half having a magnetic fire seal coupled to an inner fixed structure (IFS) of the left thrust reverser half, in accordance with various embodiments.

Referring now to FIG. 2, and continuing reference to FIG. 1B, left thrust reverser half 136 is illustrated, in accordance with various embodiments. The left thrust reverser half 136 includes a left (or first) half of IFS 137 and a left (or first) half of outer sleeve 141. It should be understood that right thrust reverser half 138 is substantially a mirror image of left thrust reverser half 136. Accordingly, it is understood that right thrust reverser half 138 includes the elements and functionalities as described herein with respect to left thrust reverser half 136.

The left thrust reverser half 136 may be coupled to right thrust reverser half 138 by latches 238. IFS 137 and outer sleeve 141 may be attached to pylon 110 via a hinge beam 135. IFS 137 may encase the core of gas turbine engine 140. In this regard, IFS 137 may encase the engine components located between fan 142 and exhaust system 134. IFS 137 may be configured to create an aerodynamically smooth path for air. IFS 137 may also be configured to create a fire and heat boundary around gas turbine engine 140.

IFS 137 includes a forward end 234 and an aft end 236. In various embodiments, IFS 137 may include an upper bifurcation wall portion 242, a lower bifurcation wall portion 244, and an inner barrel portion 246. Inner barrel portion 246 may be formed between upper bifurcation wall portion 242 and lower bifurcation wall portion 244.

In various embodiments, a magnetic fire seal 250 may be coupled to IFS 137. Magnetic fire seal 250 may comprise an upper bifurcation seal portion 252 and a forward edge seal portion 254. Upper bifurcation seal portion 252 may be located in close proximity to the joint between upper bifurcation wall portion 242 and inner barrel portion 246 of IFS 137. Upper bifurcation seal portion 252 may be configured to contact and form a sealing interface with pylon 110. Forward edge seal portion 254 may extend along forward end 234 of IFS 137. Forward edge seal portion 254 may be configured to contact and form a sealing interface with an outer case structure of gas turbine engine 140. Magnetic fire seal 250 may further include a lower bifurcation seal portion 256. Lower bifurcation seal portion 256 may be configured to contact and form a sealing interface with right thrust reverser half 138, for example, with a lower bifurcation wall portion of IFS 137 on right thrust reverser half 138. Magnetic fire seal 250 may seal the engine core from areas exterior to nacelle 100. Magnetic fire seal 250 may comprise a fire resistance material (e.g., a material capable to withstand temperatures up to 900° F. (482° C.)), and may shield exterior components from heat produced by gas turbine engine 140 during and after operation.

Figure 3:
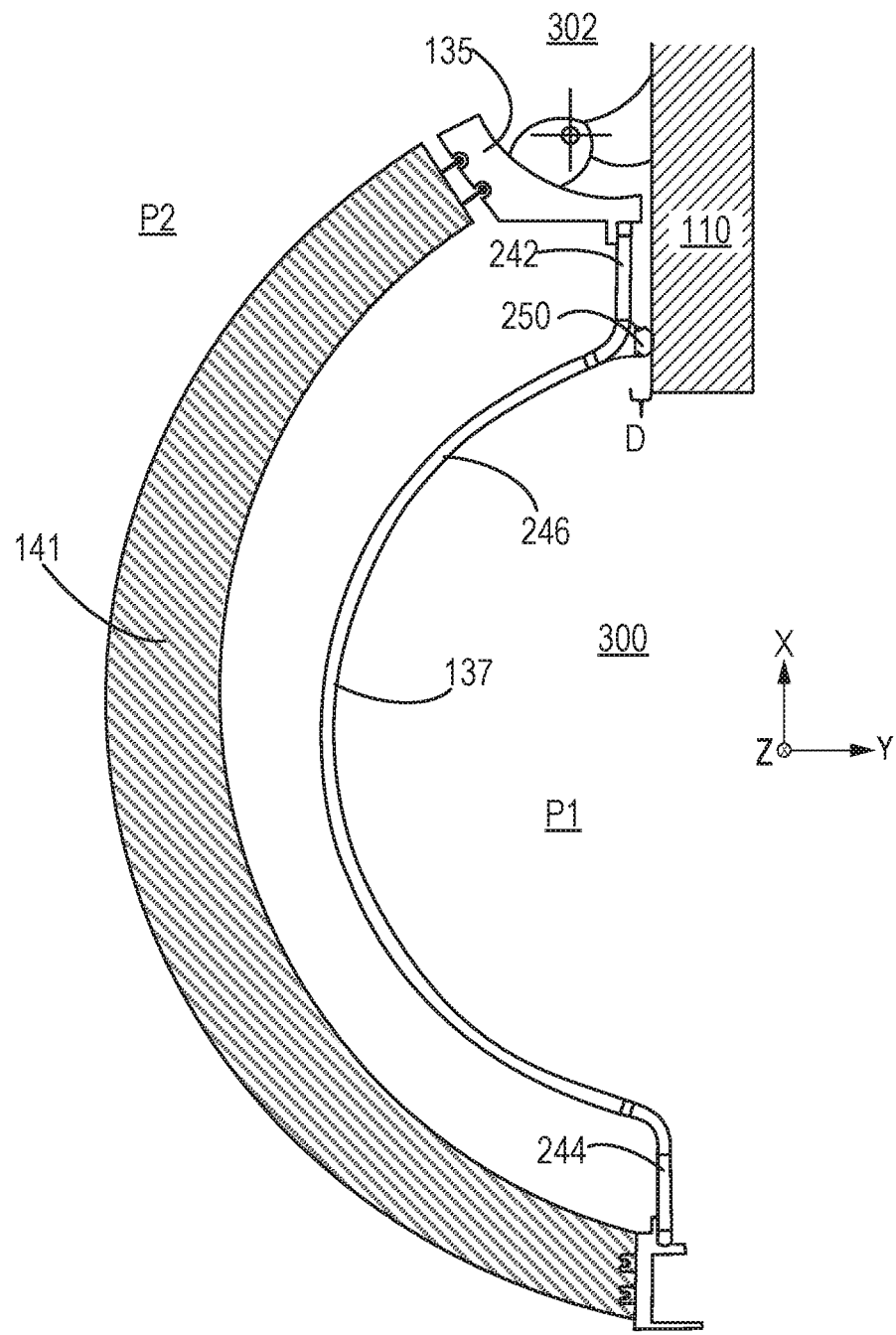
FIG. 3 illustrates a cross-section view of a left IFS half and a left outer sleeve half hingeably coupled to a pylon, in accordance with various embodiments.

With reference to FIG. 3, a cross-section of the left halves of IFS 137 and outer sleeve 141 is illustrated, in accordance with various embodiments. In various embodiments, the left halves of IFS 137 and outer sleeve 141 may be attached to hinge beam 135. Hinge beam 135 may form a hinge joint with pylon 110 such that IFS 137 and outer sleeve 141 may pivot relative to pylon 110. It should be understood that the right halves of IFS 137 and outer sleeve 141 are substantially a mirror images of the left halves, and are attached to pylon 110 in a similar manner.

In accordance with various embodiments, magnetic fire seal 250 may contact pylon 110 and form a seal between pylon 110 and IFS 137. IFS 137 may define, at least, a portion of a core engine compartment 300. Magnetic fire seal 250 may provide sealing between core engine compartment 300 and an area 302 exterior to core engine compartment 300. During operation, core engine compartment 300 may experience a pressure P1 and exterior area 302 may experience a pressure P2. Pressure P1 may be different from pressure P2, thereby creating a pressure differential (ΔP) across magnetic fire seal 250. In the event of a burst duct or other engine structure failure, pressure P1 and the difference between pressure P1 and pressure P2 may increase, for example, the pressure differential may increase to 6.5 pounds per inch (psi) (44,816 Pa) or greater. The increased pressure P1 and/or increased pressure differential (ΔP) may apply a radially outward force to IFS 137, thereby causing a radially outward translation of IFS 137 and increasing a deflection distance D between IFS 137 and pylon 110.

To cover increased deflections (i.e., greater distances D), conventional fire seals are formed with increased interior seal diameter. However, larger interior diameters may exceed packaging constraints. Additionally, as the interior diameter increases, the seal tends to become more susceptible to bending, or "buckling", at increased pressure differentials. Magnetic fire seal 250, as described in further detail below, includes a magnet which is configured to stretch magnetic fire seal 250 in response to increases in deflection distance D. Accordingly, magnetic fire seal 250 may have an interior diameter that is less than the interior diameter of a conventional, non-magnetic fire seals capable of spanning the same deflection distance. Magnetic fire seal 250 may thus be employed in narrower seal envelopes and may be less susceptible to bending.

Figure 4A:
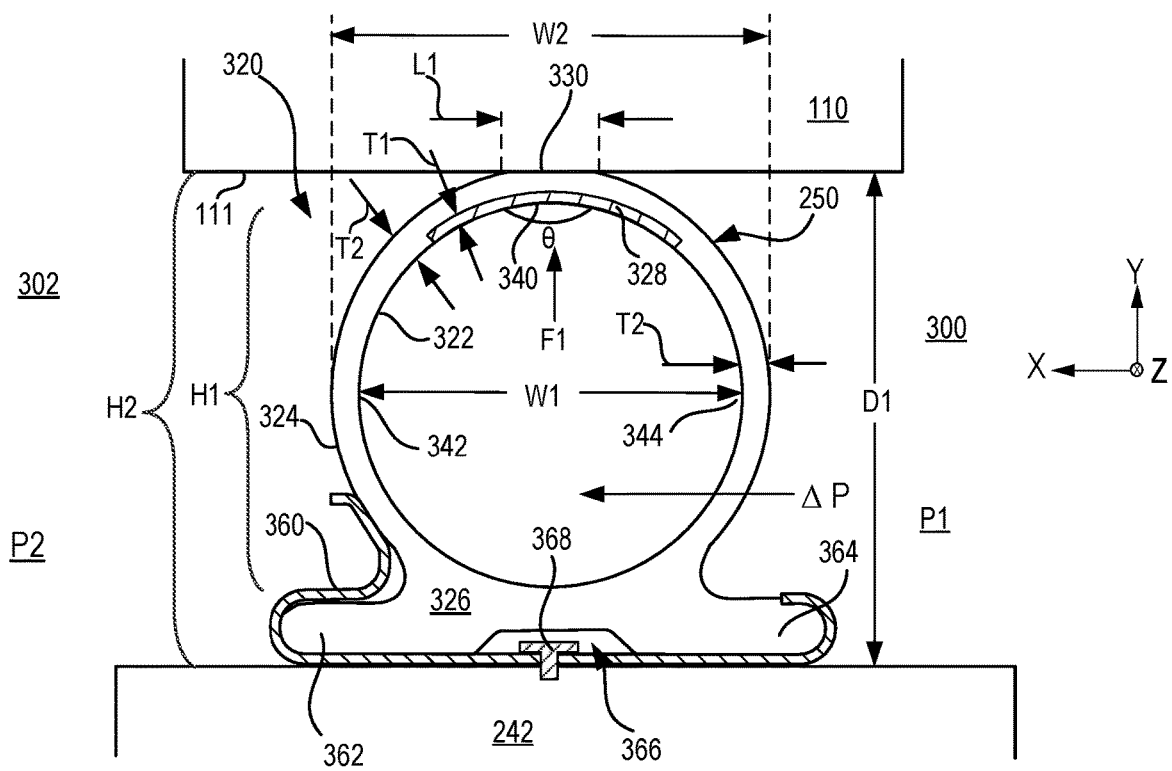
FIG. 4A illustrates a magnetic fire seal in an equilibrium position, in accordance with various embodiments.

With reference to FIG. 4A, a cross-section view of magnetic fire seal 250 in an equilibrium position is illustrated. As used herein, "equilibrium position" refers to a seal that is in neither a compressed nor stretched state. In various embodiments, magnetic fire seal 250 may be located in a seal envelope 320 defined, at least, partially by pylon 110 and upper bifurcation wall portion 242. In the equilibrium position, magnetic fire seal 250 is neither compressed nor stretched. Magnetic fire seal 250 includes an interior surface 322 and an exterior surface 324. Exterior surface 324 is configured to form a sealing interface 330 with pylon 110. In this regard, exterior surface 324 contacts surface 111 of pylon 110 and forms sealing interface 330 having a length L1. Stated differently, a length L1 of exterior surface 324 contacts pylon 110 in the equilibrium position. Interior surface 322 is generally opposite exterior surface 324. Interior surface 322 may define a hollow interior of magnetic fire seal 250.

Figure 4B:
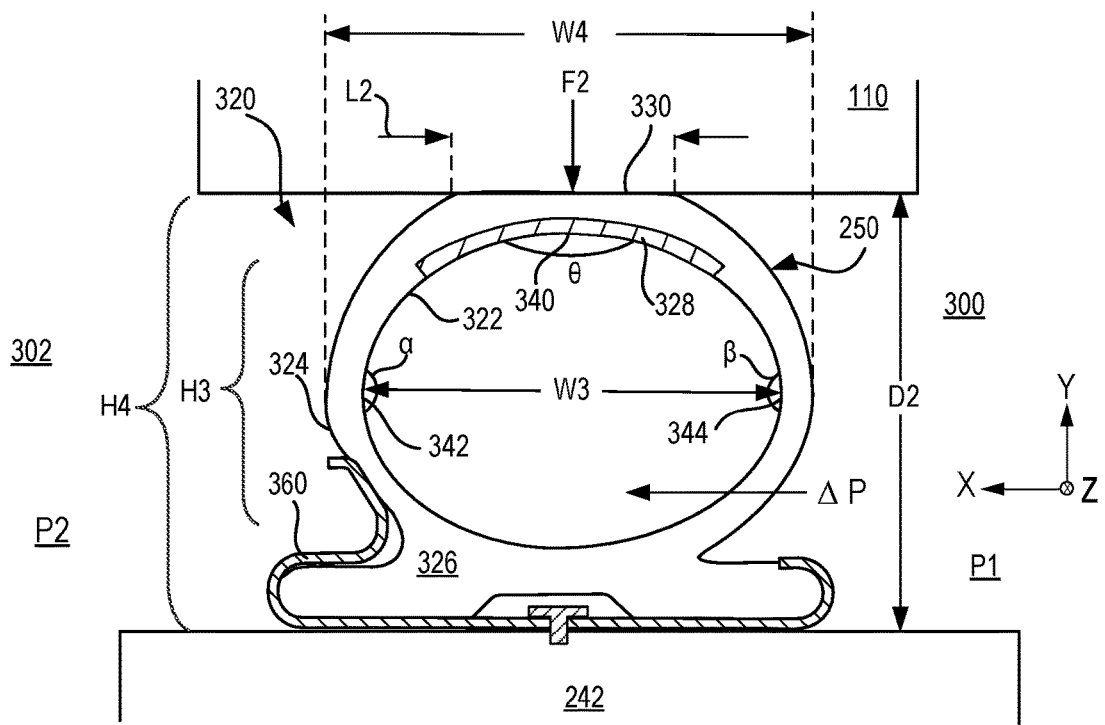
FIG. 4B illustrates a magnetic fire seal in a compressed position, in accordance with various embodiments.
Figure 4C:
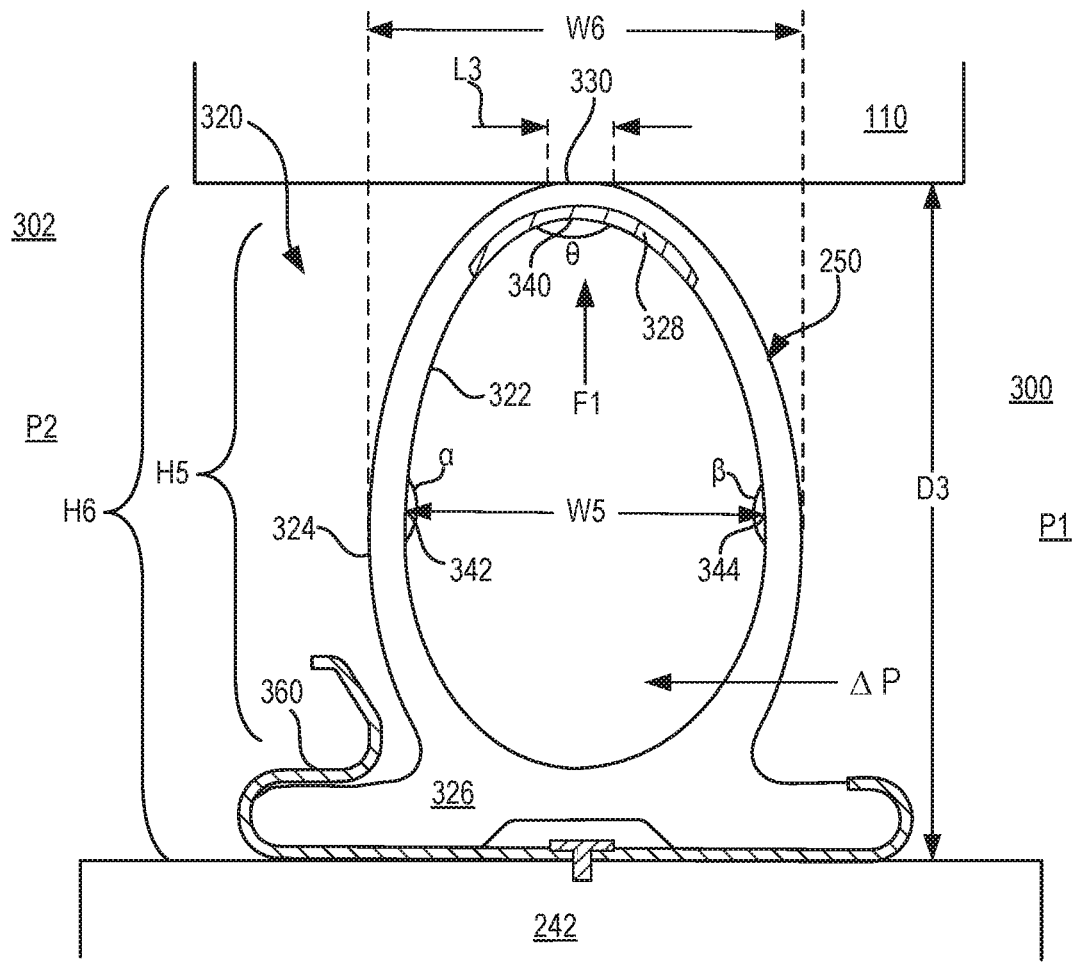
FIG. 4C illustrates a magnetic fire seal in a stretched position, in accordance with various embodiments.

Magnetic fire seal 250 may be coupled to upper bifurcation wall portion 242 via a retainer 360. For instance, magnetic fire seal 250 may include flanges 362, 364, which may be received by retainer 360. In various embodiments, magnetic fire seal 250 may define a gap 366. Gap 366 may be configured to accommodate one or more fastener(s) 368 used to attach retainer 360 to upper bifurcation wall portion 242. In various embodiments, magnetic fire seal 250 may be secured to retainer 360 using adhesives, mechanical fasteners, press fitting, and/or the like. In various embodiments, magnetic fire seal 250 may be secured directly to upper bifurcation wall portion 242 using adhesives, mechanical fasteners, press fitting, and/or the like. In various embodiments, retainer 360 may be attached to pylon 110 and magnetic fire seal 250 may form sealing interface 330 with upper bifurcation wall portion 242. While FIGS. 4A, 4B, and 4C illustrate a portion of magnetic fire seal 250 located between pylon 110 and upper bifurcation wall portion 242 (e.g., upper bifurcation seal portion 252 in FIG. 2), it is understood that other portions of magnetic fire seal 250 (e.g., forward edge seal portion 254 and lower bifurcation seal portion 256 as shown in FIG. 2) include the elements and functionalities as described herein with respect to the portion of magnetic fire seal 250 located between pylon 110 and upper bifurcation wall portion 242.

In various embodiments, exterior surface 324 and interior surface 322 of magnetic fire seal 250 may be formed from a polymer such as silicone (i.e., polysiloxane). Exterior surface 324 and interior surface 322 surround an interior material 326 of magnetic fire seal 250. In various embodiments, interior material 326 comprises a fire resistant material. In various embodiments, interior material 326 is configured to withstand temperatures up to 900° F. (482° C.). Stated differently, in various embodiments, interior material 326 may have a melting temperature of greater than 600° F. (350° C.), greater than 800° F. (427° C.), and/or greater than 900° F. (482° C.). In various embodiments, interior material 326 may comprise fiberglass, fiber-reinforce polymer, carbon fabric, and/or flame-resistant meta-aramid material (such as that sold under the mark NOMEX). The materials of magnetic fire seal 250 (i.e., the materials forming exterior surface 324, interior surface 322, and interior material 326) may be selected such that magnetic fire seal 250 will exhibit a sufficient elasticity (e.g., a compression up to 20% of an exterior width W2 of magnetic fire seal 250) at temperatures ranging from −62° F. (−52° C.) to 900° F. (482° C.), while being stiff enough to resist bending due to varying pressure differentials ΔP. For example, the materials of magnetic fire seal 250 may be selected to resist bending at pressure differentials ΔP of greater than 6.5 psi (44,816 Pa).

Magnetic fire seal 250 includes a magnet 328 located proximate sealing interface 330 (i.e., proximate surface 111 of pylon 110) and generally opposite upper bifurcation wall portion 242. In various embodiments, magnet 328 may be located between exterior surface 324 and interior surface 322 with at least a portion of interior material 326 located between magnet 328 and exterior surface 324. Magnet 328 may comprise a flexible, magnetic material, which is magnetically attracted to the material of pylon 110. The magnetic attraction between magnet 328 and pylon generates a force F1 which may translate magnetic fire seal 250 toward pylon 110. A thickness T1 of magnet 328, as measured in a direction extending from interior surface 322 to exterior surface 324, may be selected such that magnet 328 exhibits a flexibility, or elasticity, similar to interior surface 322. In various embodiments, thickness T1 may be between 5% to 75% of a thickness T2 of magnetic fire seal 250, as measured in the equilibrium state between interior surface 322 and exterior surface 324. In various embodiments, thickness T1 may be between 5% to 50% of thickness T2. In various embodiments, thickness T1 may be between 5% to 25% of thickness T2.

In various embodiments, magnet 328 may comprise a single, unibody magnetic structure. In various embodiments, magnet 328 may comprise a plurality of magnetic structures dispersed along interior surface 322. In various embodiments, magnet 328 may comprise a magnetic composite material comprising a flexible matrix or binder such as a flexible polymer material having magnetic particles dispersed therein. In various embodiments, magnet 328 is configured to span between 5% to 45% of a circumference of interior surface 322. In various embodiments, magnet 328 is configured to span between 10% to 40% of a circumference of interior surface 322. In various embodiments, magnet 328 is configured to span between 10% to 30% of a circumference of interior surface 322.

In various embodiments, in the equilibrium position, interior surface 322 may form a circle. At its widest point, as measured in the x-direction on the provide XY axes (i.e., as measured in a direction parallel to sealing interface 330), interior surface 322 includes a first interior diameter, or interior width, W1. At its tallest point, as measured in the y-direction on the provide XY axes (i.e., as measured in a direction perpendicular to sealing interface 330), interior surface 322 includes a second interior diameter, or interior height, H1. In various embodiments, in the equilibrium position, interior height H1 may be equal to interior width W1.

In various embodiments, at its widest point, as measured in the x-direction (i.e., as measured in a direction parallel to sealing interface 330), exterior surface 324 includes a first exterior diameter, or exterior width, W2. At its tallest point, as measured in the y-direction (i.e., as measured in a direction perpendicular to sealing interface 330), exterior surface 324 includes a second exterior diameter, or exterior height, H2.

In various embodiments, magnetic fire seal 250 is configured such that, at the equilibrium position, the length L1 of sealing interface 330 is at least 2% of exterior width W2. In various embodiments, magnetic fire seal 250 is configured such that, at the equilibrium position, the length L1 of sealing interface 330 is at least 5% of exterior width W2. In various embodiments, magnetic fire seal 250 is configured such that, at the equilibrium position, the length L1 of sealing interface 330 is at least 10% of exterior width W2. Magnet 328 may increase the sealing interface length L1 of magnetic fire seal 250 in the equilibrium position, as compared to conventional, non-magnetic seals of the same exterior diameter in the equilibrium position. The magnetic attraction between magnet 328 and pylon 110 may increase a resistance to bending of magnetic fire seal 250 in the equilibrium position. In this regard, magnetic fire seal 250 may withstand greater pressure differentials ΔP as compared to conventional, non-magnetic seals of similar material and geometry. The magnetic attraction between magnet 328 and pylon 110 may also allow magnetic fire seal 250 to employ a more flexible material as compared to conventional, non-magnetic seals of similar geometry, for example, as compared to conventional, non-magnetic seals of similar interior and exterior widths.

Referring to FIG. 4B, and with continued reference to FIG. 4A, a cross-section view of magnetic fire seal 250 in a compressed position is illustrated. In various embodiments, magnetic fire seal 250 may be compressed by translation of upper bifurcation wall portion 242 toward pylon 110. In this regard, a distance D2 between upper bifurcation wall portion 242 and pylon 110 is less than distance D1 between upper bifurcation wall portion 242 and pylon 110 in FIG. 4A. The translation of upper bifurcation wall portion 242 causes pylon to apply a force F2 to magnetic fire seal 250. Magnetic fire seal 250 may compress in response to force F2.

In the compressed position, interior surface 322 includes a first interior diameter, or interior width, W3 at its widest point as measured in the x-direction, and a second interior diameter, or interior height, H3 at its tallest point as measured in the y-direction. Interior height H3 is less than interior height H1, and interior width W3 is greater than interior width W1. In various embodiments, in the compressed position, interior height H3 may be less than interior width W3. As magnetic fire seal 250 compresses, the angle theta (θ) formed by a portion 340 of the interior surface 322 proximate magnet 328 increases, the angle alpha (α) formed by a portion 342 of the interior surface 322 at interior width W1 decreases, and the angle beta (β) formed by a portion 344 of the interior surface 322 at interior width W1 decreases. In various embodiments, portions 342 and 344 are approximately −90° and +90°, respectively, from portion 340. In the equilibrium position of FIG. 4A, the angle theta (θ) formed by a portion 340 may be equal to the angles alpha (α) and beta (β) formed, respectively, by portions 342 and 344.

In the compressed position, exterior surface 324 includes a first exterior diameter, or exterior width, W4, at its widest point as measured in the x-direction. At its tallest point, as measured in the y-direction (i.e., as measured in a direction perpendicular to sealing interface 330), exterior surface 324 includes a second exterior diameter, or exterior height, H4. Exterior height H4 is less than exterior height H2 (FIG. 4A), and exterior width W4 is greater than exterior width W2 (FIG. 4A). A length L2 of sealing interface 330 in the compressed position may be greater than the length L1 of sealing interface 330 in the equilibrium position. In various embodiments, magnet 328 may increase length L2 of sealing interface 330, such that magnetic fire seal 250 forms a longer sealing interface as compared to a conventional, non-magnetic seal of similar geometry at the same level compression. For example, the sealing interface length L2 of magnetic fire seal 250 at 20% compression may be greater than the sealing interface length of conventional, non-magnetic seal of similar geometry at 20% compression.

Referring to FIG. 4C, and with continued reference to FIG. 4A, a cross-section view of magnetic fire seal 250 in a stretched position is illustrated. In various embodiments, magnetic fire seal 250 may be stretched when a distance D3 between upper bifurcation wall portion 242 and pylon 110 is greater than distance D1 in FIG. 4A. The force F1 generated by the magnetic attraction between magnet 328 and pylon 110 causes to magnetic fire seal 250 to stretch. In various embodiments, deflection distances of D1 or greater may be associated with and/or generated by a burst duct or other failure event. In other words, magnetic fire seal 250 may be configured to be in a compressed position under normal operating conditions. In various embodiments, deflection distances of greater than D1 may be associated with pressure differentials ΔP of 6.5 psi (44,816 Pa) or greater.

In the stretched position, interior surface 322 includes a first interior diameter, or interior width, W5 at its widest point, as measured in the x-direction, and a second interior diameter, or interior height, H5 at its tallest point, as measured in the y-direction. Interior height H5 is greater than interior height H1 (FIG. 4A), and interior width W5 is less than interior width W1 (FIG. 4A). In various embodiments, in the stretched position, interior height H5 may be greater than interior width W5. As magnetic fire seal 250 stretches, the angle theta (θ) formed by portion 340 of interior surface 322 decreases, and the angles alpha (θ) and beta (β) formed, respectively, by portions 342 and 344 of interior surface 322 increase.

In the stretched position, exterior surface 324 includes a first exterior diameter, or exterior width, W6, at its widest point as measured in the x-direction, and second exterior diameter, or exterior height, H6 at its tallest point, as measured in the y-direction. Exterior width W6 is less than exterior width W2 (FIG. 4A), and exterior height H6 is greater than exterior height H2 (FIG. 1). Sealing interface 330 includes a length L3 in the stretched position. In various embodiments, a ply layup of interior material 326 may be varied according to location. For example, in proximity to magnet 328, interior material 326 may include three (3) plies, while two plies may be found in other locations. In this way, magnetic fire seal 250 may be configured to have increased stiffness proximate to sealing interface 330, which may increase the length L3 of sealing interface 330 in the stretched position.

In various embodiments, magnetic fire seal 250 is configured such that, in the stretched position, the length L3 of sealing interface 330 is at least 2% of exterior width W6. In various embodiments, magnetic fire seal 250 is configured such that, in the stretched position, the length L3 of sealing interface 330 is at least 5% of exterior width W6. In various embodiments, magnetic fire seal 250 is configured such that, in the stretched position, the length L3 of sealing interface 330 is at least 10% of exterior width W6.

As depicted in FIGS. 4A, 4B, and 4C, magnetic fire seal 250 is configured to compress in response to force F2 applied by pylon 110, and to stretch in response to force F1 generated by magnetic attraction between magnet 328 and pylon 110. Magnetic fire seal 250 may form a sealing interface in the compressed, equilibrium, and stretched positions. Magnetic fire seal 250 may provide sealing at deflection distances conventionally associated with larger diameter fire seals. Magnetic fire seal 250 may have a smaller diameter as compared to conventional, non-magnetic seals, due to conventional, non-magnetic seals not translating to a stretched position. Stated another way, conventional, non-magnetic seals translate between the compressed and equilibrium positions, and are thus formed with an exterior height at equilibrium that is large enough to span the deflection distance associated with a burst event. In various embodiments, exterior height H2 of magnetic fire seal 250, as measured in the equilibrium position of FIG. 4A, is less than the deflection distance D3 of FIG. 4C. In various embodiments, deflection distance D3 may be associated with a burst event and/or with a pressure differential ΔP of 6.5 psi (44,816 Pa) or greater. Magnet 328 may also increase the length of the sealing interface 330 of magnetic fire seal 250, and may allow magnetic fire seal 220 to adapt to angularity in pylon 110 and/or in upper bifurcation wall portion 242.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A magnetic fire seal for a nacelle, comprising:
   an exterior surface;
   an interior surface opposite the exterior surface, wherein in an equilibrium position the interior surface forms a circle;
   a fire-resistant material disposed between the exterior surface and the interior surface; and
   a magnet located at the interior surface, wherein a portion of the fire-resistant material is located between the magnet and the exterior surface;
   wherein the magnetic first seal is configured to provide sealing between an engine core compartment and an area exterior to the engine core compartment both in the equilibrium position and in a non-equilibrium position.

2. The magnetic fire seal of claim 1, wherein the fire-resistant material comprises a melting temperature of greater than 600° Fahrenheit.

3. The magnetic fire seal of claim 1, wherein the magnetic fire seal is configured to withstand a pressure differential of at least 6.5 pounds per square inch.

4. The magnetic fire seal of claim 1, wherein in a stretched position an angle formed by a portion of the interior surface proximate the magnet decreases relative to the angle when the magnetic fire seal is in the equilibrium position, wherein the non-equilibrium position comprises the stretched position.

5. The magnetic fire seal of claim 4, wherein the magnetic fire seal is configured such that in the stretched position an interior height of the magnetic fire seal, as measured at the interior surface in a first direction, is greater than an interior width of the magnetic fire seal, as measured at the interior surface in a second direction perpendicular to the first direction.

6. The magnetic fire seal of claim 5, wherein the magnet spans between 10% to 30% of a circumference of the interior surface.

7. The magnetic fire seal of claim 6, wherein the fire-resistant material comprises a first number of plies at a first location proximate the magnet, and wherein the fire-resistant material comprises a second number of plies at a second location different from the first location, the second number of plies being less than the first number of plies.

8. The magnetic fire seal of claim 1, wherein a thickness of the magnet, as measured in a direction extending from the interior surface to the exterior surface, is between 5% to 50% of a thickness of the magnetic fire seal, as measured between the interior surface and the exterior surface in the equilibrium position.

9. A propulsion system, comprising:
   a pylon;
   an inner fixed structure hingeably coupled to the pylon and defining, at least, a portion of a core engine compartment; and
   a magnetic fire seal coupled to the inner fixed structure and providing sealing between the core engine compartment and an area exterior to the core engine compartment both in an equilibrium position and in a non-equilibrium position, wherein the magnetic fire seal comprises:
      an exterior surface configured to form a sealing interface with the pylon;
      an interior surface opposite the exterior surface;
      a fire-resistant material surrounded by the exterior surface and the interior surface; and
      a magnet located between the interior surface and the exterior surface and proximate the sealing interface,
      wherein the magnetic fire seal is configured to translate to a stretched position in response to a pressure differential of at least 6.5 pounds per square inch between the core engine compartment and the area exterior to the core engine compartment, and wherein an exterior height of the magnetic fire seal in the stretched position is greater than the exterior height of the magnetic fire seal in the equilibrium position, the exterior height of the magnetic fire seal being measured at a tallest point on the exterior surface and in a direction perpendicular to the sealing interface, wherein the non-equilibrium position comprises the stretched position.

10. The propulsion system of claim 9, wherein a portion of the fire-resistant material is located between the magnet and the exterior surface.

11. The propulsion system of claim 10, wherein the fire-resistant material comprises a melting temperature of greater than 600° Fahrenheit.

12. The propulsion system of claim 9, wherein the magnetic fire seal comprises:
- an upper bifurcation seal portion coupled to an upper bifurcation wall of the inner fixed structure; and
- a forward edge seal portion coupled to a forward edge of the inner fixed structure.

13. The propulsion system of claim 9, wherein the magnetic fire seal is configured such that, in the stretched position, an interior height of the magnetic fire seal as measured at the interior surface in the direction perpendicular to the sealing interface is greater than an interior width of the magnetic fire seal, as measured at the interior surface in a direction parallel to the sealing interface.

14. The propulsion system of claim 9, wherein in the equilibrium position, the interior surface of the magnetic fire seal forms a circle.

15. A propulsion system, comprising:
- a gas turbine engine;
- a pylon mounted to the gas turbine engine;
- an inner fixed structure hingeably coupled to the pylon and defining, at least, a portion of a core engine compartment; and
- a magnetic fire seal located in a sealing envelope defined, at least, partially by the inner fixed structure and at least one of the pylon or the gas turbine engine, wherein the magnetic fire seal provides sealing between the core engine compartment and an area exterior to the core engine compartment both in an equilibrium position and in a non-equilibrium position, and wherein the magnetic fire seal comprises:
  - an exterior surface configured to form a sealing interface with the at least one of the pylon or the gas turbine engine;
  - an interior surface opposite the exterior surface;
  - a fire-resistant material surrounded by the exterior surface and the interior surface; and
  - a magnet located proximate the sealing interface,
  - wherein the magnetic fire seal is configured to translate to a stretched position in response to a pressure differential of at least 6.5 pounds per square inch between the core engine compartment and the area exterior to the core engine compartment, and wherein an exterior height of the magnetic fire seal in the stretched position is greater than the exterior height of the magnetic fire seal in the equilibrium position, the exterior height of the magnetic fire seal being measured at a tallest point on the exterior surface and in a direction perpendicular to the sealing interface, wherein the non-equilibrium position comprises the stretched position.

16. The propulsion system of claim 15, wherein a portion of the fire-resistant material is located between the magnet and the exterior surface.

17. The propulsion system of claim 15, wherein in the equilibrium position, the interior surface of the magnetic fire seal forms a circle.

18. The propulsion system of claim 17, wherein the magnetic fire seal is configured such that, in the stretched position, an interior height of the magnetic fire seal is greater than an interior width of the magnetic fire seal, the interior height being measured at the interior surface in the direction perpendicular to the sealing interface, and the interior width being measured at the interior surface in a direction parallel to the sealing interface.

\* \* \* \* \*